Oct. 29, 1957     D. H. GREENWOOD     2,811,179
TANK CAR LOADER

Filed May 7, 1954                               2 Sheets-Sheet 1

DOLPHICE H. GREENWOOD,
INVENTOR.

BY
ATTORNEY

Oct. 29, 1957   D. H. GREENWOOD   2,811,179
TANK CAR LOADER
Filed May 7, 1954   2 Sheets-Sheet 2
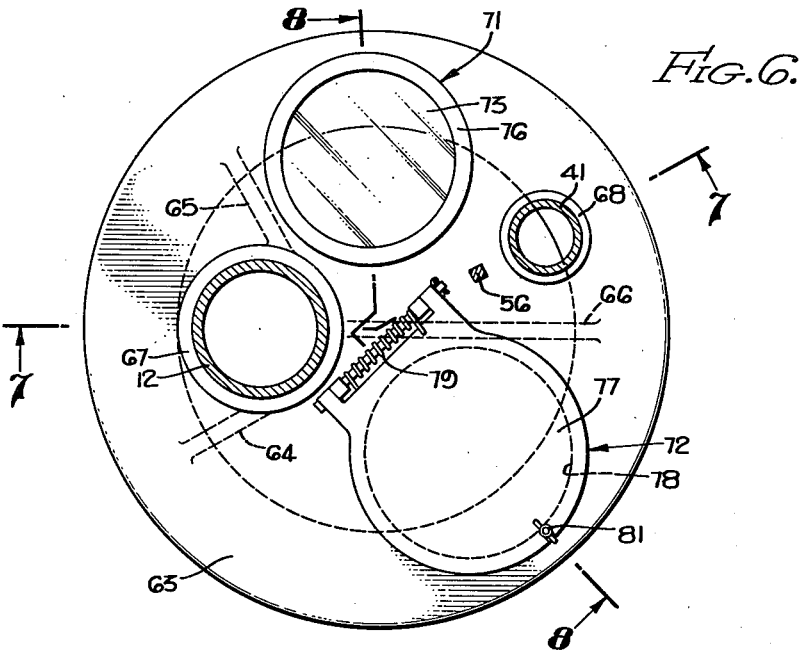
FIG. 6.
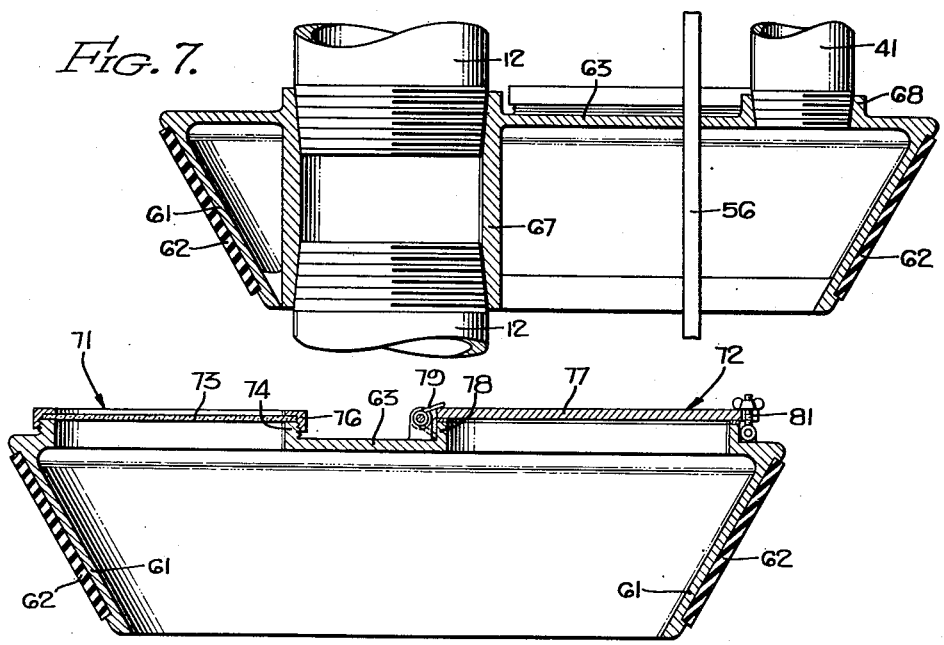
FIG. 7.
FIG. 8.
DOLPHICE H. GREENWOOD,
INVENTOR.
BY
ATTORNEY United States Patent Office 2,811,179
Patented Oct. 29, 1957

2,811,179

TANK CAR LOADER

Dolphice H. Greenwood, Pasadena, Calif.

Application May 7, 1954, Serial No. 428,223

5 Claims. (Cl. 141—95)

This invention relates to a loading device, and particularly to a means for loading volatile hydrocarbon and similar liquids into a railway tank car or a tank truck while regulating or preventing escape of vapors into the atmosphere.

It has been definitely established that hydrocarbon vapors are substantial contributors to the air pollution or "smog" which adversely affects the health, welfare and comfort of the inhabitants of Los Angeles and certain other communities. A very substantial reason for the existence of large amounts of hydrocarbon vapors in Los Angeles, and other cities where oil is refined, is the fact that many thousands of railway tank cars and tank trucks are loaded with gasoline and the like, the loading of each car or truck resulting in the escape of a volume of vapor at least equal to the volume of the car or truck itself. Not only does vapor escape due to its displacement by liquid introduced into the car or truck, but it also escapes when liquid entering the car overflows and spills out onto the ground as the result of negligence on the part of the person handling the filling operation. The liquid thus spilled volatilizes almost immediately and results in passage of a large amount of vapors into the air.

In view of the above factors characteristic of the field of tank truck and tank car loading, it is an object of the present invention to provide an improved means for effecting loading of volatile hydrocarbon liquids into a tank car or truck without permitting either uncontrolled passage of displaced vapors into the atmosphere or spilling of liquids onto the ground.

Another object of the invention is to provide a tank car loader which may be used with numerous types and sizes of tank car domes, which permits the operator to view the height of the liquid in the car, and which is simple and economical to construct, maintain and operate.

These and other objects and advantages of the invention will be more fully set forth in the following specification and claims considered in connection with the attached drawing to which they relate.

In the drawing:

Figure 6 is a plan view illustrating the vapor escape preventing and regulating device of a second embodiment of the invention;

Figure 7 is a horizontal sectional view taken along the broken line 7—7 of Figure 6; and Figure 8 is a horizontal sectional view along the broken line 8—8 of Figure 6.

Figure 1:
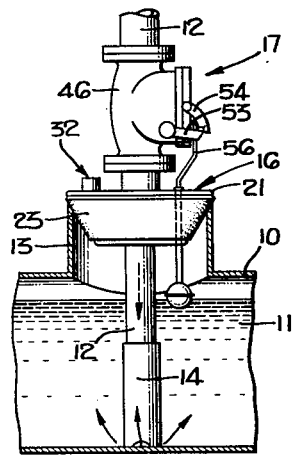
Figure 1 is a view showing a typical tank car in fragmentary vertical central section, and illustrating the tank car loader in side elevation.

Referring to the drawing, and particularly to Figure 1, the invention is illustrated as employed in filling a typical railway tank car 10 with a volatile hydrocarbon or other liquid 11, for example gasoline. The filling of tank car 10 is accomplished by inserting a fill pipe 12 through an uncapped cylindrical dome 13, the fill pipe being adapted to telescope so that its lower section 14 will always rest on the bottom wall of the car. It is to be understood that the fill pipe 12 and related equipment are connected to a conventional boom or derrick adapted to lift them out of a filled tank car and into the air while a second unfilled tank car is shifted beneath them for filling. It is also to be understood that after the tank car is filled the dome cover, not shown, is placed on dome 13 to prevent subsequent spilling and vaporization.

According to the first embodiment of the present invention, shown in Figures 2–5, the fill pipe 12 is provided at dome 13 with a vapor escape regulating and preventing device 16, and is provided above the device with a shut off valve 17 adapted to close automatically when the liquid 11 in tank car 10 reaches a predetermined level. Vapor escape prevention device 16 comprises a central conduit portion 18 which is interiorly threaded at its upper and lower ends to receive threaded portions of fill pipe 12, the conduit portion 18 being cast integral with three equally spaced radially extending webs 19. Webs 19 extend outwardly for integral connection with a frustoconical wall 21 which converges downwardly or toward the interior of tank car 10, the major and minor diameters of wall 21 being respectively greater and smaller than the average diameter of a tank car dome 13. The central conduit 18, webs 19, and wall 21 are preferably cast integral and of a light metal such as aluminum. Lightening holes 22 are provided in webs 19 to maintain the weight of the unit at a minimum.

Figure 3:
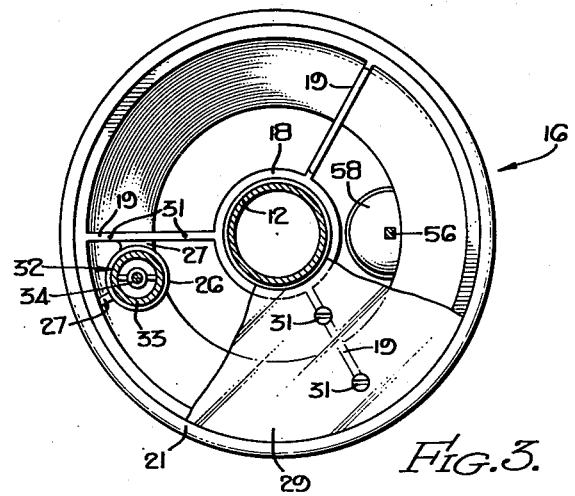
Figure 3 is a horizontal section along line 3—3 of Figure 2.
Figure 2:
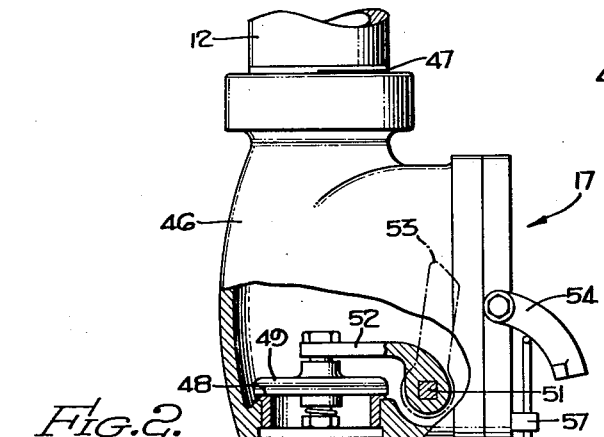
Figure 2 is an enlarged vertical central sectional view of the loader shown in Figure 1.
Figure 4:
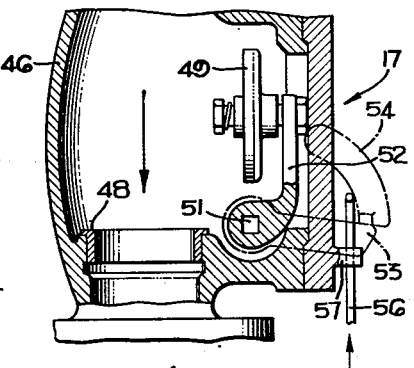
Figure 4 is a vertical central sectional view of the automatic shut off valve, the valve being shown in fully open position as distinguished from the fully closed position illustrated in Figure 2.

The outer surface of wall 21 is recessed slightly to receive a frusto-conical sealing gasket 23 which is substantially coextensive with the wall 21 and is formed of a suitable material such as rubber. As illustrated in Figure 1, the gasket 23 is adapted to seat on the upper rims of domes 13 of various diameters and to prevent any escape of vapors between the dome and the unit 16, these vapors instead passing through the opening between the lower edge of wall 21 and central conduit 18. Referring next to Figure 3, a female fitting 26 is secured to lugs 27 attached to the upper portion of wall 21 and to one of the webs 19, the construction being preferably integral although welding may be employed if desired. Fitting 26, the upper portion of wall 21, and the upper portion of central conduit 18 are provided with suitable shoulders, as illustrated in Figure 2, and on which are mounted suitable gaskets or seals 28. A cover disc 29 seats on gaskets 28, and around fitting 26 and conduit portion 18, and is held in position by screws 31 (Figure 3) extending downwardly into webs 19. The cover disc 29 is formed of a suitable transparent substance, such as a transparent plastic, so that the operator may look through it and view the level of the liquid 11 in car 10. Because of the presence of the cover disc 29 and the gaskets 28, a sealing relationship is created which prevents escape of vapors except through the outlet port through fitting 26 as will next be described.

To regulate the escape of vapor as it is displaced by liquid 11 flowing into the tank car through fill pipe 12, a spring biased poppet valve 32 is provided as shown in Figure 2. Valve 32 comprises a cylinder 33 threaded downwardly into the fitting 26 and formed with a central guide portion 34, the latter being adapted to slidably receive the stem of a poppet 36 the head of which seats at the upper cylinder end. A helical compression spring 37 is mounted around the poppet stem and seated between the lower surface of guide portion 34 and an adjustable nut 38 at the lower stem end. It is to be understood that the spring 37 prevents escape of vapor until a predetermined pressure is reached, and that this pressure may be varied by adjusting the position of nut 38 on the poppet stem. Because of the presence of the valve 32, a large proportion of the vapor is maintained within the car 10 and may not escape freely into the air.

Figure 5:
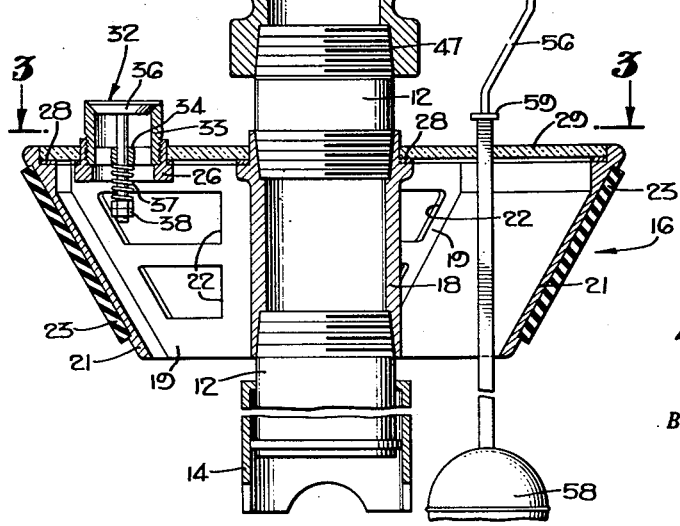
Figure 5 is a fragmentary view of a vapor pipe or conduit adapted to be connected to the vapor port in place of the spring biased valve illustrated in Figure 2.

Referring next to Figure 5, a modification is shown in which a suction line 41 is threaded into female fitting 26 in place of poppet valve 32, the line 41 being connected to a suitable vapor recovery means, not shown. In operation, the line 41 is employed to suck vapor out of tank car 10 as the liquid 11 enters the same, so that none of the vapor may pass into the air.

The automatic shut off valve 17 comprises a valve casing 46 which is inserted in fill pipe 12 by means of threaded connections 47. Casing 46 is formed with a valve seat 48 and encloses a valve disc 49 movable from a seated position, shown in Figure 2, to an open position shown in Figure 4. A shaft 51 is journaled horizontally in the walls of casing 46 adjacent valve seat 48 and is connected by means of an arm 52 to the upper portion of valve disc 49. Mounted on shaft 51 externally of casing 46 is a crank 53 which is generally at right angles to arm 52 and is movable to effect valve opening and closing. A latch 54 is pivoted to the exterior valve casing surface and is adapted to hold the crank 53 in the horizontal position shown in Figure 4, the arm 52 then being generally vertical with the valve open. To effect outward pivoting of latch 54 and thus permit the valve disc 49 to fall to its closed position, a float rod 56 is provided and is slidably mounted in a guide 57 on the valve casing. Rod 56 extends downwardly through an aperture in cover disc 29 to a float ball 58, there being a shoulder 59 on the float rod to hold the ball in an elevated position when the tank car is empty. Suitable sealing means, not shown, are provided to prevent leakage of vapors through the float rod aperture in the cover disc.

In the operation of the vapor escape prevention device 16 and the shut off valve 17, let it be assumed that tank car 10 is empty and that the fill pipe 12 and associated apparatus have been, by means of a boom or derrick, inserted to the position shown in Figure 1. The tank car being empty, the shoulder 59 is seated on cover disc 29 and the float rod 56 is in its lowest position. Crank 53 is then manually pivoted clockwise, as viewed in Figures 2 and 4, and to the Figure 4 position, after which latch 54 is pivoted downwardly to hold the crank horizontal, thereby effecting maintenance of the valve 17 in open condition. Gasoline is then introduced through fill pipe 12 and the open valve 17 to effect filling of tank car 10, vaporized fuel then tending to pass into the atmosphere but being prevented by the sealing gasket 23 and gaskets 28, the only escape for the fuel being through the valve 32 (Figure 2) or the suction line 41 (Figure 5). As the level of the fuel 11 in tank car 10 approaches the upper tank car wall the float ball 58 moves upwardly and, the upper end of float rod 56 being disposed underneath latch 54 which is slightly curved as illustrated, a camming action results which effects outward pivoting of the latch to effect release of crank 53. Valve disc 49 of shut off valve 17 then pivots downwardly, due to the combined action of its own weight and the downward flow of the fuel, and seats on seat 48 to prevent further entrance of fuel. The fill pipe and associated equipment are then lifted out of tank car 10 for subsequent insertion into the next car to be filled.

Referring next to Figures 6–8, a second embodiment of the vapor escape prevention and regulation device is illustrated. According to the second embodiment of the invention, a frusto-conical wall 61 is cast integral with a cover portion 63, the wall 61 having on its exterior surface a removable sealing gasket 62 adapted to seat on dome 13. Three webs 64–66 are cast integral with wall 61 and cover 63, the webs being disposed generally in the shape of a Y and having an offset conduit portion 67 cast integral in the cradle of the Y as best shown in Figure 6. Conduit portion 67 is threadedly connected into fill pipe 12 as in the case of conduit 18 of the first embodiment of the invention, it being understood that the valve 17 and float rod 56 are also associated with the fill pipe and vapor escape prevention device as in the first embodiment. A threaded aperture 68 is provided in cover portion 63 adjacent the base of web 66 and is adapted to threadedly connect either to the suction pipe 41, shown in Figure 5, or to a spring loaded valve 32 as shown in Figure 2.

It has been found in using the tank car loader that a transparent window is adequate for most instances when the operator desires to view the level of the fuel 11 in the car 10. However, under some conditions such as when the sun is shining at certain angles relative to the surface of the transparent cover, it is impossible for the operator to view the fuel level as desired. Accordingly, the second embodiment of the invention provides both a permanently mounted transparent window 71 and a covered opening 72, the latter being employed when conditions are such that use of window 71 is unsatisfactory. Window 71 comprises a disc 73 formed of transparent plastic and retained on an offset threaded boss portion 74 of cover 63 by means of a threaded retaining ring 76. Covered opening 72 comprises an annular flap 77 which is suitably hinged at the central portion of cover 63 and is adapted to seat over an annular opening 78 in the cover. A spring 79 is provided on the hinged mechanism for the purpose of urging the flap toward closed position, and a latch 81 is provided to secure the flap in closed position. Suitable sealing means are provided to prevent escape of vapor between flap 77 and the boss portion of the cover on which it is seated.

The operation of the embodiment shown in Figures 6–8 is the same as that described in connection with Figures 1–5 except in connection with the means for viewing the level of the liquid 11 in tank car 10. In most instances, for example on a cloudy day, the liquid level may be viewed merely by looking through the transparent window 73. However, should the angle of the sun be such that reflection on transparent element 73 prevents this means of viewing the fuel level, latch 81 is released and flap 77 lifted momentarily against the bias of spring 79, so that the operator may look directly through aperture 78 and determine the fuel level. Thereafter, the flap is permitted to snap back to closed or seated position and latch 81 is secured.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A liquid-dispensing adapter designed for use in filling railway tank cars through a manhole-type access dome while preventing the uncontrolled escape of vapors therefrom, said adapter comprising a frustoconical shell provided on its exterior with a resilient gasket adapted to seat sealingly against the inner rim edge of the inlet end of a tank car access dome, a large capacity liquid conduit extending through said adapter having radial arms projecting outwardly toward and secured to said shell, a cover disk of transparent material encircling said conduit, and means providing a sealing connection between the rim edges of said cover disk and the juxtaposed parts of said adapter, said cover disk providing a large area viewing window through which the car-filling operation can be viewed without allowing the escape of vapors.

2. A liquid-dispensing adapter as defined in claim 1 including normally closed means operable to maintain vapors of the liquid being dispensed against escape to the atmosphere, said normally closed means being movable to an open position venting vapor to the atmosphere after a predetermined vapor pressure has been reached, and independent level-responsive means for discontinuing the flow of liquid through said conduit when liquid has reached a predetermined level within the car being filled.

3. A liquid-dispensing adapter designed for use in filling railway tank cars through a manhole-type access dome while preventing the uncontrolled escape of vapors therefrom, said adapter comprising a frustoconical shell provided on its exterior with a resilient gasket adapted to seat sealingly against the inner rim edge of the inlet end of a tank car dome, a large capacity conduit extending through said adapter and having a length extending partially to the bottom of a tank car, a sleeve telescopically supported on the discharge end of said conduit having a lower end adapted for support adjacent the bottom of a tank car being filled with liquid and being slidable along said first-mentioned conduit between a retracted position and an extended position against the bottom of a tank car, means including a disk-like cover inter-connecting said first-named conduit and the larger diameter rim edge of said frustoconical shell, said cover including a transparent fluid-tight window through which the filling operation can be viewed while maintaining said adapter sealed to the car access dome.

4. A liquid-dispensing adapter as defined in claim 3 including a normally closed but manually operable cover which can be opened momentarily to permit viewing of the car interior during the filling operation should said transparent window become fogged and ineffective for viewing purposes.

5. A liquid-dispensing adapter as defined in claim 3 wherein said liquid-dispensing conduit includes a large area check valve movable between a closed position cutting off liquid flow and an open position to one side of the path of liquid flow, weight means for gravity-biasing said check valve in open position, and independently supported liquid level responsive means movable when the liquid level in the car being filled reaches a predetermined level for closing said check valve.

References Cited in the file of this patent

UNITED STATES PATENTS

| 408,911 | Chagnon et al. | Aug. 13, 1889 |
| 916,425 | Ellingwood | Mar. 30, 1909 |
| 1,083,183 | Bednarowicz | Dec. 30, 1913 |
| 1,746,814 | Benedict et al. | Feb. 11, 1930 |
| 1,881,106 | Vogt et al. | Oct. 4, 1932 |
| 2,326,415 | Titus | Aug. 10, 1943 |
| 2,329,426 | Valiton | Sept. 14, 1943 |
| 2,503,295 | Palmer | Apr. 11, 1950 |
| 2,507,545 | Samiran | May 16, 1950 |
| 2,658,653 | Mahan | Nov. 10, 1953 |

FOREIGN PATENTS

| 367,798 | Great Britain | Feb. 19, 1932 |